US007770063B2

(12) United States Patent
Robertson et al.

(10) Patent No.: US 7,770,063 B2
(45) Date of Patent: Aug. 3, 2010

(54) SIMULATION OF FAILURE RECOVERY WITHIN CLUSTERED SYSTEMS

(75) Inventors: Alan L. Robertson, Broomfield, CO (US); Andrew J. Beekhof, Bayern (DE)

(73) Assignees: International Business Machines Corporation, Armonk, NY (US); Novell, Inc., Provo, UT (US)

( * ) Notice: Subject to any disclaimer, the term of this patent is extended or adjusted under 35 U.S.C. 154(b) by 465 days.

(21) Appl. No.: 11/467,551

(22) Filed: Aug. 26, 2006

(65) Prior Publication Data

US 2008/0126829 A1 May 29, 2008

(51) Int. Cl.
*G06F 11/00* (2006.01)

(52) U.S. Cl. .............................. 714/15; 714/25; 714/33

(58) Field of Classification Search ...................... 714/2, 714/4, 11, 15, 25, 33, 41, 43; 703/17
See application file for complete search history.

(56) References Cited

U.S. PATENT DOCUMENTS

| | | | |
|---|---|---|---|
| 5,483,637 A | | 1/1996 | Winokur et al. |
| 6,002,861 A | * | 12/1999 | Butts et al. .................... 703/17 |
| 6,108,699 A | | 8/2000 | Moiin |
| 6,408,343 B1 | | 6/2002 | Erickson et al. |
| 6,438,705 B1 | | 8/2002 | Chao et al. |
| 6,446,219 B2 | | 9/2002 | Slaughter et al. |
| 6,535,990 B1 | | 3/2003 | Iterum et al. |
| 6,609,213 B1 | | 8/2003 | Nguyen et al. |
| 6,675,217 B1 | | 1/2004 | Dani et al. |
| 6,728,896 B1 | | 4/2004 | Forbes et al. |
| 6,785,678 B2 | | 8/2004 | Price |
| 6,789,213 B2 | | 9/2004 | Kumar et al. |
| 6,877,107 B2 | | 4/2005 | Giotta et al. |
| 6,892,330 B2 | | 5/2005 | Lee |

(Continued)

FOREIGN PATENT DOCUMENTS

JP   2002091938 A   6/2002

(Continued)

OTHER PUBLICATIONS

Carreiro et al., "High performance/high availability interprocessor communication method," IBM Technical Disclosure Bulletin, Jul. 1998.

(Continued)

*Primary Examiner*—Robert Beausoliel
*Assistant Examiner*—Joseph D Manoskey
(74) *Attorney, Agent, or Firm*—Steven Lieske Bennett

(57) ABSTRACT

Failure recovery within clustered systems is simulated. For each of a number of failure conditions for an initial state of a number of computing elements of a computerized system, a failure state of the computing elements is generated that corresponds to the failure condition and that is based on the initial state of the computing elements. A failure condition may include one or more hardware and/or software failures. For each failure state of the computing elements, a recovery state is then generated, or simulated, for the computing elements, based on the failure state and the initial state of the computing elements and on a number of recovery rules for the computing elements. Each recovery state is then output for subsequent analysis, where such analysis may be either with human interaction, or automatically and without human interaction.

18 Claims, 3 Drawing Sheets

U.S. PATENT DOCUMENTS

| | | | |
|---|---|---|---|
| 7,047,176 B2 * | 5/2006 | Klevans et al. | 703/21 |
| 7,228,458 B1 * | 6/2007 | Kesavan | 714/41 |
| 7,392,165 B2 * | 6/2008 | Nixon et al. | 714/E11.167 |
| 2003/0208284 A1 * | 11/2003 | Stewart et al. | 700/30 |
| 2004/0199807 A1 * | 10/2004 | Ghosh et al. | 714/4 |
| 2005/0171752 A1 * | 8/2005 | Patrizio et al. | 703/17 |

FOREIGN PATENT DOCUMENTS

| | | | |
|---|---|---|---|
| JP | 2004032452 A | 1/2004 | |

OTHER PUBLICATIONS

A. Markosian et al., "Model-based approach allows design for yield," EE Times (Internet web site www.eetimes.com/showArticle.jhtml?articleID=160900827), Apr. 18, 2005.

M. Neumann et al., "A rule-based vs. a model-based implement of the knowledge system LIMPACT . . . ," Proc. of 3rd Conf. of Int'l Soc'y for Ecological Informatics, 2003.

* cited by examiner

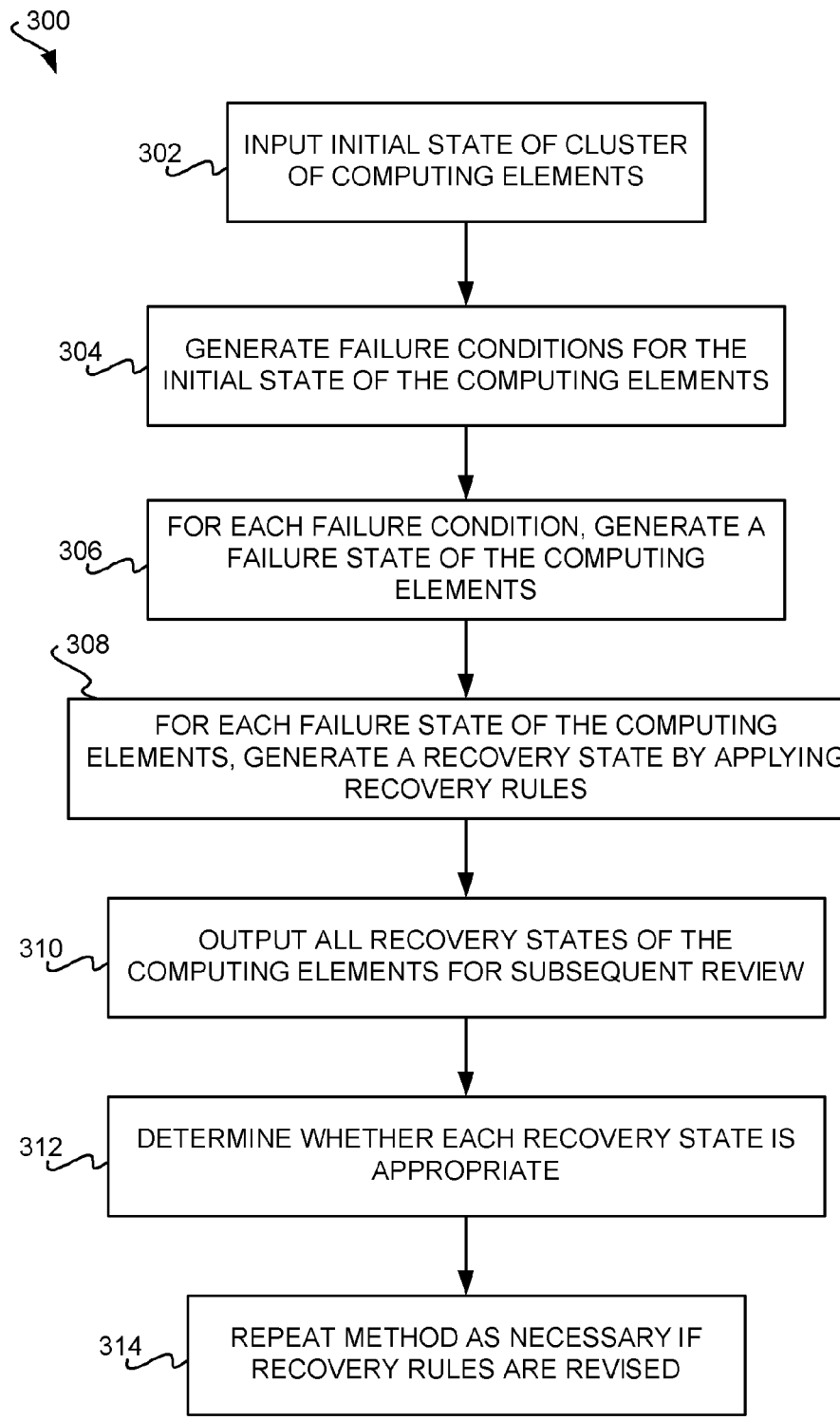

SIMULATION OF FAILURE RECOVERY WITHIN CLUSTERED SYSTEMS

FIELD OF THE INVENTION

The present invention relates generally to computerized systems, or clusters, having a number of computing elements, and more particularly to simulating failure recovery within such clustered systems.

BACKGROUND OF THE INVENTION

Clustering is a common technique to improve the availability of services, such as web hosting services and database services, provided by a computerized system. Clustering refers to using more than one computing node, or computing element, such as more than one computing device like a server computing device, in a cooperative manner to provide one or more desired services. For example, a simple clustered system may have two computing elements or nodes. If one of these computing nodes fails, then ideally the other computing node is able to take over, so that the services provided by the system can continue being provided even in light of this failure.

Clustered systems can be relatively complex. There may be two, three, four, or more computing nodes or elements within such a system. The software run by the system may be divided among the computing elements of the system in a fairly particular manner. For example, a given system may host a number of web-related services and a number of database-related services. A node of the system may be allowed to run a particular subset of the web-related services, and a particular subset of the database-related services, so that no node, or server, is too overloaded, to ensure the performance of these services.

As clustered systems become more complex, ensuring that failures within such systems are recovered from in a graceful manner becomes more important and yet more difficult. Failures within clustered systems may include hardware failures, such as the hardware of one or more of the nodes or elements failing, as well as software failures, such as the software of one or more of the computing elements of the cluster failing. Designers of clustered systems typically provide recovery rules, or policies, which instruct a clustered system how to recover from failures. For example, if a given computing element fails, then the software running on that computing element may be moved to other computing elements within the system. As another example, if the software on a given computing element fails, causing it to consume too many resources on the computing elements, the other software running on that computing element may be moved to other computing elements within the system, so as not to impede the performance of this software.

For a simple clustered system having just two nodes, elements, or servers, and a small number of software services running on these nodes, it is relatively easy to construct a set of recovery rules dictating what is to occur for most if not all combinations of different failures that may afflict the system. Furthermore, because a simple clustered system may have a relatively finite number of things that can go wrong, testing these recovery rules is also a fairly straightforward process. For instance, all of the possible failures can be forced within an actual instance of the clustered system, to verify that the system recovers in the desired manner.

However, for complex clustered systems, it may be difficult to construct a set of recovery rules that allows a system to properly recover from every possible combination of failures. This is because the designer of such a complex clustered system has to envision all the different combinations of failures that are likely to occur, and then fashion the recovery rules accordingly. Furthermore, actual testing of all the different combinations of failures is time- and cost-prohibitive: it can be difficult if not impossible for the designer to force an actual instance of a clustered system to fail in all these different ways.

Therefore, typically what occurs is that a designer of a clustered system tests just some number of failures of the clustered system by actually failing the clustered system in a limited number of ways. Once it has been shown that the clustered system in actuality properly recovers from these failures, testing is finished. However, because such testing is not exhaustive, actual failures in the clustered system may still occur that the designer may have not foreseen, and for which his or her developed recovery rules do not provide for proper recovery. This possibility effectively limits the reliability of clustered systems.

For these and other reasons, therefore, there is a need for the present invention.

SUMMARY OF THE INVENTION

The present invention relates generally to simulating failure recovery within clustered systems. In a method of one embodiment of the invention, for each of a number of failure conditions for an initial state of a number of computing elements of a computerized system, or cluster, a failure state of the computing elements is generated that corresponds to the failure condition and that is based on the initial state of the computing elements. A failure condition may include one or more hardware and/or software failures. For each failure state of the computing elements, a recovery state is then generated, or simulated, for the computing elements, based on the failure state and the initial stat of the computing elements and on the recovery rules for the computing elements. Each unique recovery state is then output for subsequent analysis.

In a method of another embodiment of the invention, for each of a number of failure conditions for an initial state of a number of computing elements of a computerized system, or cluster, a failure state of the computing elements is generated that represents a state of the computing elements based on the failure condition occurring to the computing elements in the initial state. For each failure state of the computing elements, a recovery state of the computing elements is generated, or simulated, by applying recovery rules to the computing elements in the failure state to yield the recovery state. Each unique recovery state is then output for subsequent analysis.

A computerized system of an embodiment of the invention includes a failure mechanism and a simulation mechanism. The failure mechanism is to generate a number of failure states of a number of computing elements by applying user-specified failure criteria to an initial state of the computing elements. The simulation mechanism is to generate a number of recovery states of the computing elements corresponding to the failure states by applying a number of recovery records to the failure states. The simulation mechanism is further to output the unique recovery states for subsequent analysis.

An article of manufacture of an embodiment of the invention includes a tangible computer-readable medium, such as a recordable data storage medium, and means in the medium. The means is for generating a number of failure states of a number of computing elements of a computerized system, or computing elements, from an initial state of the computing elements. The means is also for generating a number of recovery states of the computing elements corresponding to the failure states, and for outputting the recovery states for subsequent analysis.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a flowchart of a method for simulating failure recovery of clustered systems, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
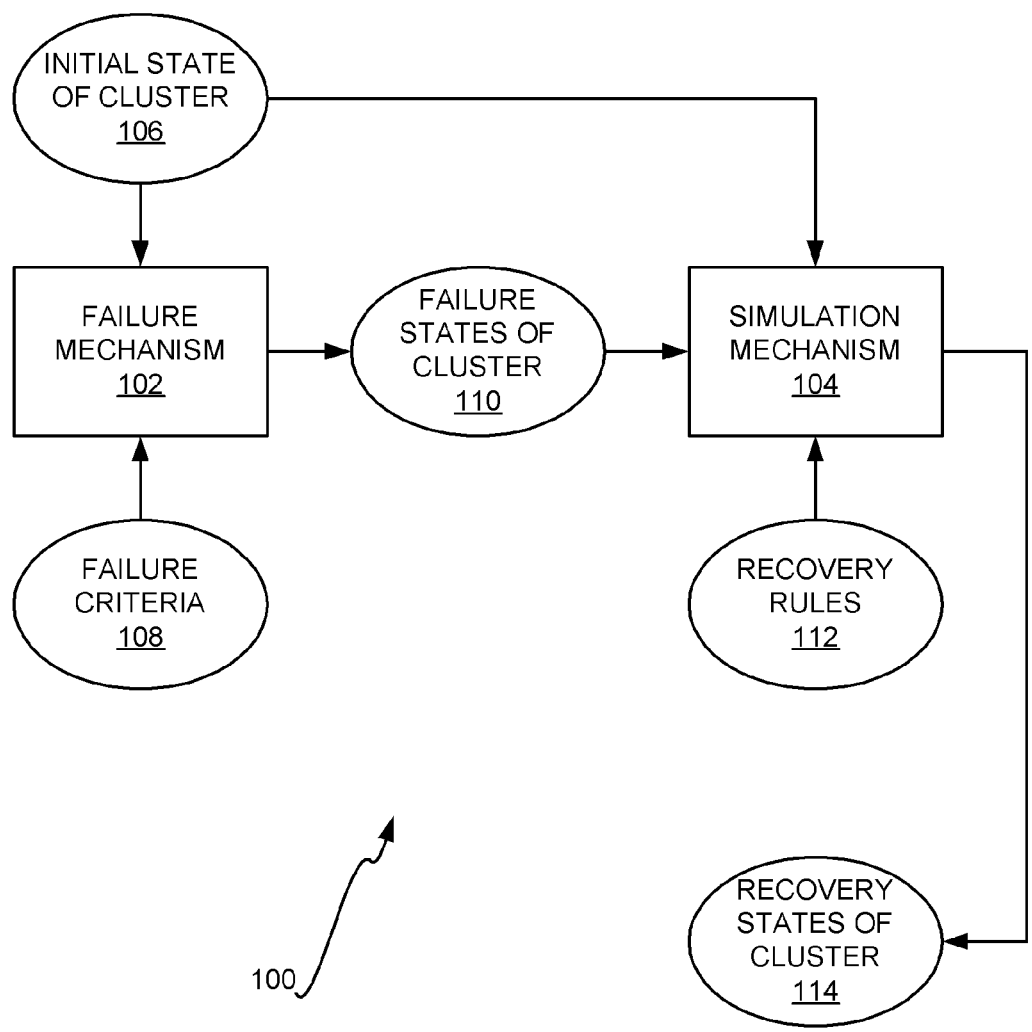
FIG. 1 is a diagram of a computerized system for simulating failure recovery of clustered systems, according to an embodiment of the invention, and is suggested for printing on the first page of the patent.

FIG. 1 shows a computerized system 100 for simulating recovery from failure of a system, or cluster, of computing elements, according to an embodiment of the invention. The system 100 includes a failure mechanism 102 and a simulation mechanism 104. Each of the mechanisms 102 and 104 may be implemented in hardware, software, or a combination of hardware and software.

An initial state 106 of the system, or cluster, of computing elements is input into the failure mechanism 102. The initial state 106 represents the proper, working state of the computing elements of the cluster and may be the state of the computing elements as to which the system is supposed to operate under normal conditions. The state of the computing elements (i.e., of the cluster itself) includes specification of the hardware of each computing element, or each computing node, of the system, as well as specification of the software running on each computing node, of the system, to provide the services of the cluster.

User-specified failure criteria 108 are also input into the failure mechanism 102. The failure criteria 108 specify each of the potential individual failures that can occur within the cluster in its initial state 106. For example, such failures may include hardware failures, including each of the computing elements crashing, or a piece of particular hardware of each computing element failing, such as network connectivity failure, memory failure, processor failure, and so on. Such failures may also include software failures, such as the software running on each computing element crashing, failing, or improperly running. As an example of the latter type of failure, software may be running on a given computing element, but may be consuming more resources than it should, or possibly giving incorrect or no results.

The failure criteria 108 may specify whether these failures occur individually and/or multiply, that is, whether these failures should be tested on an individual basis and/or on a combined basis. Each unique set of the failures that is desired to be tested is referred to herein as a failure condition, and a set of failures can include just a single failure. For example, the failures may include hardware failures HW1, HW2, and HW3, and software failures SW1 and SW2. The failure conditions may thus include {HW1}, {HW2}, {HW3}, {SW1}, {SW2}, {HW1, SW1}, {HW1, SW2}, {HW1, HW2}, {HW1, HW3}, {HW2, SW1}, {HW2, SW2}, {HW2, SW3}, {HW3, SW1}, {HW3, SW2}, and {SW1, SW2}, which are all possible combinations of one or two of the failures occurring. The failure conditions may also include some or all possible combinations of three of the failures occurring.

Furthermore, the failure conditions may also include multiple failure conditions occurring serially, such that a first failure occurs, then recovery is accomplished to correct this failure, and then another failure occur, which may indeed result from the previous recovery. Therefore, the recovery state generated by a given failure is treated as a new initial state, in relation to which a subsequent failure may occur. Failures, in other words, may occur such that failure analysis is iterative.

Based on the failure criteria 108 and the initial state 106 of the computing elements, the failure mechanism 102 generates a number of failure states 110 of the computing elements of the cluster (i.e., of the cluster itself). Each of the failure states 110 represents a state of the computing elements of the clustered system after a corresponding failure condition has been applied to the initial state of the computing elements. The failure states 110 thus each represents the state of the computing elements after the failures of a corresponding failure condition have occurred to the initial state of the computing elements.

The simulation mechanism 104 inputs the failure states 110 of the computing elements, and also may input the initial state 106 of the computing elements as well. The simulation mechanism 104 further inputs a set of recovery rules 112. The recovery rules 112 specify how the computing elements of the clustered system are to recover from failures. For instance, in the prior art, a clustered system that encounters failures in one or more of its computing elements would actually apply the recovery rules 112 to reconfigure itself in order to recover from the failures in question. The recovery rules 112 may be simple if/then rules, or may be more complex sets of rules, as can be appreciated by those of ordinary skill within the art.

Based on the failure states 110 of the computing elements, the recovery rules 112, and optionally the initial state 106 of the computing elements, the simulation mechanism 104 simulates the recovery of the computing elements in each of their failure states 110, to generate a number of recovery states 114 of the computing elements of the cluster (i.e., of the cluster itself). Each of the recovery states 114 represents a state of the computing elements of the clustered system after application of the recovery rules 112 to a corresponding one of the failure states 110. The application of the recovery rules 112 to the failure states 110 may take into account the initial state 106 of the computing elements, and this is why the initial state 106 may optionally be input into the simulation mechanism 104.

The simulation mechanism 104 outputs the recovery states 114 of the computing elements of the clustered system for review and analysis by the designer of the clustered system, by other personnel, by an automated system, or a combination of these. For each of the recovery states 114, for instance, the initial state 106, the corresponding one of the failure states 110 that yielded to the recovery state, and the failure condition that caused this failure state, may be output. Therefore, the designer is able to review the recovery states 114, to ensure that they are appropriate states of the computing elements of the clustered system. If any of the recovery states 114 are not appropriate, then the designer is able to further review the failure state from which the recovery state in question resulted, and the failure condition that caused the failure state, as well as the initial state 106, to determine how the recovery rules 112 should be revised.

It is noted that the computerized system 100 that includes the failure mechanism 102 and the simulation mechanism 104 is typically not the cluster that is the subject of the testing and simulation by the system 100. The computerized system 100 may be easily run on a laptop or other computing device having a limited number of computing resources, for instance. In this way, a complex and expensive cluster can be easily tested in a simulated manner, without having to actually force failures within the clustered system itself, as in the prior art.

Technical Background

Figure 2:
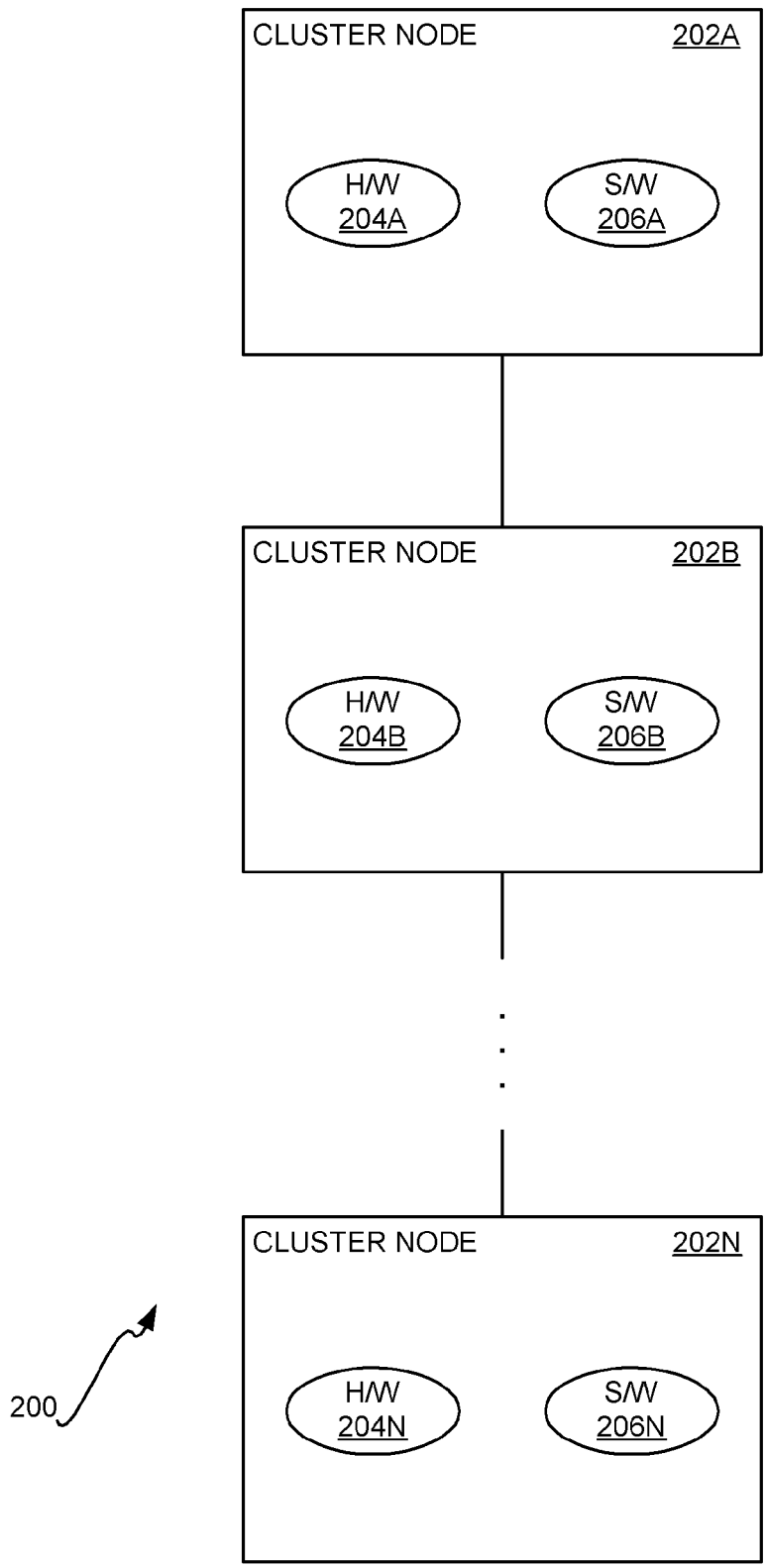
FIG. 2 is a diagram of a representative clustered system, in conjunction with which embodiments of the invention may be practiced.

FIG. 2 shows a rudimentary and example clustered system 200, in conjunction with which embodiments of the invention may be practiced. The clustered system 200 includes a number of cluster nodes 202A, 202B, . . . 202N, collectively referred to as the cluster nodes 202, and which are also referred to herein as computing elements. Each of the cluster nodes, or computing elements, 202 may be a separate computing device, such as a server computing device, for instance.

Each of the cluster nodes 202 has hardware, and has software running on this hardware. That is, the cluster nodes 202 have hardware 204A, 204B, . . . , 204N, collectively referred to as the hardware 204, and have software 206A, 206B, . . . , 206N, collectively referred to as the software 206, running on the hardware 204. The given hardware and/or running software of any of the cluster nodes 202 is not necessarily, and is often not, the same, across all the cluster nodes 202.

The cluster nodes 202 operate in a cooperative manner to ensure high availability of the services provided by the clustered system 200. For instance, the clustered system 200 may provide both database services and web hosting services. The software 206A and 206B of the cluster nodes 202A and 202B may be web hosting-related software, while the software 206N of the cluster node 202N may be database-related software. The web-hosting related software of the software 206A and 206B may be referred to in shorthand as WA and WB, respectively, whereas the database-related software of the software 206N may be referred to in shorthand as D.

The hardware 204A of the cluster node 202A may be selected to provide for high-performance web hosting services. For instance, the hardware 204A may include multiple network adapters so that sufficient network bandwidth connectivity can be achieved, and is referred to in shorthand in the state descriptions below as NETA for descriptive convenience within the state descriptions. By comparison, the hardware 204N of the cluster node 202N may be selected to provide for robust database services. For instance, the hardware 204N may include extensive storage devices, such as hard disk drives, so that sufficient database storage can be achieved, and is referred to in shorthand in the state descriptions below as STRN for descriptive convenience.

Furthermore, the hardware 204B of the cluster node 202B may be selected to provide for both high-performance web hosting services and database services, even though the software 206B of the cluster node 202B just includes web hosting-related software initially. Thus, the hardware 204B are referred to in shorthand in the state descriptions below as NETB and STRB for descriptive convenience. The initial configuration, or the initial state 106, of the cluster nodes 202 of the clustered system 200 may therefore be summarized as: {NODE 202A: NETA, WA}; {NODE 202B: NETB, STRB, WB}; and, {NODE 202N: STRN, D}.

Two example recovery rules are now provided for the cluster nodes 202 of the clustered system 200. One recovery rule may specify that if the NETB hardware of the hardware 204B of the cluster node 202B fails, to simply do nothing. The rationale for this recovery rule may be that the cluster node 202A should be able to accommodate the increased workload in providing the web services of the clustered system 200 with acceptable degradation in performance, while the NETB hardware is being repaired. Another recovery rule may be to route traffic normally intended for the cluster node 202B to another node provide the same or similar services.

Therefore, a user may specify failure criteria including the NETB hardware of the hardware 204B of the cluster node 202B failing. In applying this particular failure condition that the NETB hardware fails, the failure mechanism 102 would generate the following failure state of the cluster nodes 202 from the initial state 106: {NODE 202A: NETA, WA}; {NODE 202B: STRB, WB}; and, {NODE 202N: STRN, D}. The node 202B thus no longer includes the NETB hardware, since it has failed.

The simulation mechanism 104 applies the recovery rule to this failure state, and can in one embodiment take into account the initial state 106 of the cluster nodes 202 of the clustered system 200. Because the recovery rule instructs that no recovery actions need to be undertaken, the recovery state of the cluster nodes 202 is thus the same as the failure state: {NODE 202A: NETA, WA}; {NODE 202B: STRB, WB}; and, {NODE 202N: STRN, D}. The user can then review this recovery state to determine whether it is appropriate and adequate, considering the failure condition that caused the failure state from which this recovery state resulted.

A second recovery state may specify that if the D software of the software 206N of the cluster node 202N fails, then the D software is to be migrated to the cluster node 202B, and thus the software 206B would then include the D software. The rationale for this recovery rule may be that the cluster node 202B has the necessary hardware 204B—specifically the hardware STRB—needed to adequately run the D software. Because initially just the cluster node 202N runs the D software, in order for the clustered system 200 to continue providing database services, if the D software fails on the cluster node 202N, then it should instead be run on or migrated to the cluster node 202B.

Therefore, a user may specify failure criteria including the D software of the software 206N of the cluster node 202N failing. In applying this particular failure condition that the D software fails, the failure mechanism would generate the following failure state of the cluster nodes 202 from the initial state 106: {NODE 202A: NETA, WA}; {NODE 20B: STRB, WB}; and, {NODE 202N: STRN}. The node 202N thus no longer includes the D software, since it has failed.

The simulation mechanism 104 applies the recovery rule to this failure state, and can in one embodiment take into account the initial state 106 of the cluster nodes 202 of the clustered system 200. Because the recovery rule instructs that the D software is to be run on or migrated to the cluster node 202B, the recovery state of the cluster nodes 202 is as follows: {NODE 202A: NETA, WA}; {NODE 202B: NETB, STRB, WB, D}; and, {NODE 202N: STRN}. Thus, the D software is now part of the software 206B of the cluster node 202B. The user can review this recovery state to determine whether it is appropriate and adequate, considering the failure condition that caused the failure state from which this recovery state resulted.

Method and Conclusion

FIG. 3 shows a method 300 for simulating the testing of a clustered system having a number of computing elements, according to an embodiment of the invention. First, the initial state of the computing elements of the clustered system is input (302). This initial state may be represented in shorthand as IS. Next, failure conditions are generated for the initial state of the computing elements (304). Each failure condition represents a unique combination of failures that can occur within the computing elements of the clustered system. The failure conditions may be automatically generated based on user-specified criteria. For example, the user may specify the individual types of failures, both hardware and software, that may be incurred within the computing elements of the system. The user may also specify whether and how these singular or single failures are to be combined to generate multiple failures.

For instance, the user may specify failures F1, F2, ..., FM, such that there are M different types of hardware and/or software failures. At a minimum, the set of failure conditions FC includes each of these failures singly, such that FC={{FX}} for each X=1, 2, ..., M. In addition, the set of failure conditions may include more members than the total number of individual failures, where a given failure condition may be defined as a combination of two or more of the individual failures. A failure condition representing two individual failures is referred to as a double failure condition, and in general a failure condition representing more than one individual failure is referred to as a multiple failure condition.

For each failure condition, a corresponding failure state of the computing elements of the clustered system is generated (306). There are an equal number of failure states and failure conditions. Thus, if there are failure conditions FC1, FC2, ..., FCJ, for a total of J failure conditions, then a corresponding number of failure states FS1, FS2, ..., FSJ is generated. A given failure state FSX is generated by FSX=function1(FCX, IS), where IS is the initial state of the computing element. That is, a given failure state is generated by applying the failure(s) of a corresponding failure condition to the initial state IS of the computing elements of the clustered system. In other words, a given failure state represents the failure(s) of a corresponding failure condition occurring to the initial state of the computing elements. Part 306 of the method 300 may be performed by the failure mechanism 102 of FIG. 1, for instance.

Next, for each failure state of the computing elements of the clustered system, a corresponding recovery state of the computing elements is generated (308). There are likewise an equal number of recovery states and failure states. Thus, if there are failure states FS1, FS2, ..., FSJ, then a corresponding number of recovery states RS1, RS2, ..., RSJ is generated. A given recovery state RSX is generated by RSX=function2(FSX, rules, IS), where IS, the initial state of the computing elements, is optional. That is, a given recovery state is generated by applying the recovery rules to a corresponding failure state, where these rules may take into account the initial state of the computing elements. Part 308 of the method 300 may be performed by the simulation mechanism 104 of FIG. 1, for instance.

All the recovery states of the computing elements of the clustered system are output for subsequent review (310), such that whether each recovery state represents an appropriate and adequate recovery from a given failure state resulting from a given failure condition can be determined (312). For instance, a user may review and analyze each recovery state, to determine whether it is an appropriate and adequate recovery from the failure state that resulted from a corresponding failure condition. If not, the user may revise the recovery rules, such that the method 300 may be repeated as necessary if the recovery rules are revised (314).

As another example of part 312, the review and analysis of the recovery states may be achieved without human interaction, and automatically. For instance, machine-learning techniques like Bayesian techniques, as well as other types of techniques, may be employed to review the recovery states, to determine whether they are appropriate for the failure states to which they correspond. As a more simple example, if a given recovery state was previously generated and then user-approved as appropriate for a particular error state, this information can be stored. Therefore, later generation of the same recovery state in response to the same error state can be automatically reviewed and approved as appropriate for the error state, without having to involve the user again. In such an instance, then, the only recovery states that are presented to the user are those that the user has not previously reviewed and approved for the particular error states in question. Therefore, this approach simplifies any human analysis that still has to be performed.

Other types of automatic review and analysis of the recovery states may include ensuring that all resources, such as all the services or applications provided by the clustered system, are running on one of the nodes, and ensuring that each unique resource, such as each unique service, is running exactly once. Furthermore, the resources may be checked against an equivalent set of policies to ensure that the recovery states are valid. Dependencies for key resources, such as key services, may also be verified, to ensure that they are all running in a satisfactory manner.

It is noted that the method 300 can be implemented as one or more computer programs, which can constitute a means, stored on a tangible computer-readable medium of an article of manufacture. The medium may be a recordable data storage medium, for instance. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

For instance, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Embodiments of the invention provide for advantages over the prior art. In the prior art, testing of the recovery rules for a clustered system, to verify how the clustered system will recover from different combinations of failures, can be accomplished only by actually forcing an actual instance of the clustered system to fail in a given way, and then observing how the clustered system recovers. As a result, testing recovery of all possible combinations of failures is time- and cost-prohibitive, since an actual instance of the clustered system has to be forced to fail in accordance with each combination of failures.

By comparison, in the invention, testing of the recovery rules for a clustered system, to verify how the clustered system will recover from different combinations of failures, is accomplished in a simulated manner. A simulation mechanism, for instance, is provided with the initial state and the failure state of a clustered system, where the failure state reflects the failure of the initial state of the clustered system in some particular way. The simulation mechanism thus outputs how the recovery rules will be applied to the failure state by yielding a corresponding recovery state of the clustered system. This process can be easily accomplished, in a time- and cost-effective manner, for all different combinations of possible failures of the clustered system.

The designer of the clustered system can then simply review the recovery states that have been output, to determine whether they represent proper and adequate recoveries of the clustered system from the failures in question. Unforeseen problems in the recovery rules may be exposed, for instance, which causes the designer to revise his or her recovery rules, and then perform further simulation. In this iterative way, the designer can be sure that the clustered system properly recovers from nearly all, if not all, combinations of different failures.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. For example, the methods of different embodiments of the invention that have been described can be implemented as computer programs that are stored on computer-readable media of articles of manufacture. Such computer-readable media may be tangible computer-readable media, like recordable data storage media. Therefore, it is manifestly intended that this invention be limited only by the claims and equivalents thereof.

We claim:

1. A method comprising:
    for each of a plurality of failure conditions, generating a failure state of a plurality of computing elements of a computerized system corresponding to the failure condition and based on an initial state of the plurality of computing elements of the computerized system, the failure conditions regarding a plurality of failures of the plurality of computing elements,
        wherein each failure comprises one of a single hardware failure within the plurality of computing elements and a single software failure within the plurality of computing elements, the failures comprising at least three failures;
        wherein the failure conditions comprise all possible combinations of one, two, and three of the failures;
    for each failure state of the plurality of computing elements of the computerized system, generating a recovery state of the plurality of computing elements of the computerized system based on the failure state and the initial state of the plurality of computing elements of the computerized system and on a plurality of recovery rules for the plurality of computing elements of the computerized system; and,
    outputting each unique recovery state of the plurality of computing elements of the computerized system for subsequent analysis of the recovery state,
    wherein one of the recovery rules comprises doing nothing.

2. The method of claim 1, further comprising initially inputting the initial state of the plurality of computing elements of the computerized system.

3. The method of claim 1, further comprising initially generating the plurality of failure conditions for the initial state of the plurality of computing elements of the computerized system.

4. The method of claim 1, wherein at least one of the failure conditions each comprises a hardware failure within at least one of the plurality of computing elements of the computerized system.

5. The method of claim 1, wherein at least one of the failure conditions each comprises a software failure within at least one of the plurality of computing elements of the computerized system.

6. The method of claim 1, wherein at least one of the failure conditions each comprises a single failure within one of the plurality of computing elements of the computerized system.

7. The method of claim 1, wherein at least one of the failure conditions each comprises a multiple failure within one of the plurality of computing elements of the computerized system.

8. The method of claim 1, wherein each failure state represents a state of the plurality of computing elements of the computerized system based on the corresponding failure condition occurring to the initial state of the plurality of computing elements of the computerized system.

9. The method of claim 1, wherein each recovery state of the plurality of computing elements of the computerized system represents a state of the plurality of computing elements of the computerized system based on applying the recovery rules to the failure state of the plurality of computing elements of the computerized system.

10. The method of claim 1, further comprising determining whether each recovery state is appropriate for the failure state to which the recovery state corresponds.

11. A method comprising:
    for each of a plurality of failure conditions for an initial state of a plurality of computing elements of a computerized system, generating a failure state of the plurality of computing elements representing a state of the plurality of computing elements corresponding to the failure condition occurring to the plurality of computing elements in the initial state, the failure conditions regarding a plurality of failures of the plurality of computing elements,
        wherein each failure comprises one of a single hardware failure within the plurality of computing elements and a single software failure within the plurality of computing elements, the failures comprising at least three failures;
        wherein the failure conditions comprise all possible combinations of one, two, and three of the failures;
    for each failure state of the plurality of computing elements, generating a recovery state of the plurality of computing elements by applying a plurality of recovery rules to the plurality of computing elements in the failure state, and based on the initial state of the plurality of computing elements, to yield the recovery state; and, outputting each unique recovery state of the plurality of computing elements for subsequent analysis of the recovery state, wherein one of the recovery rules comprises doing nothing.

12. The method of claim 11, further comprising initially:

inputting the initial state of the plurality of computing elements of the computerized system; and, generating the plurality of failure conditions for the initial state of the plurality of computing elements of the computerized system.

13. The method of claim 11, wherein each failure condition comprises at least one of:

a hardware failure within at least one of the plurality of computing elements;

a software failure within at least one of the plurality of computing elements;

a single failure; and, a multiple failure.

14. The method of claim 11, further comprising determining whether each recovery state is appropriate for the failure state to which the recovery state corresponds.

15. A computerized system comprising:

hardware;

a failure mechanism implemented at least in the hardware and to generate a plurality of failure states of a plurality of computing elements by applying user-specified failure criteria to an initial state of the plurality of computing elements, the failure criteria regarding a plurality of failures of the plurality of computing elements, wherein each failure comprises one of a single hardware failure within the plurality of computing elements and a single software failure within the plurality of computing elements, the failures comprising at least three failures;

wherein the failure criteria comprise all possible combinations of one, two, and three of the failures; and, a simulation mechanism implemented at least in the hardware and to generate a plurality of recovery states of the plurality of computing elements corresponding to the failure states by applying a plurality of recovery rules to the failure states and based on the initial state of the plurality of computing elements, and to output the unique recovery states for subsequent analysis, wherein one of the recovery rules comprises doing nothing.

16. The computerized system of claim 15, wherein each failure state represents a failure occurring within the plurality of computing elements in the initial state.

17. The computerized system of claim 16, wherein the failure of each failure state comprises at least one of:

a hardware failure within at least one of the plurality of computing elements;

a software failure within at least one of the plurality of computing elements;

a single failure; and, a multiple failure.

18. An article of manufacture comprising:

a tangible computer-readable data storage medium; and, means in the medium for generating a plurality of failure states of a plurality of computing elements of a computerized system from an initial state of the plurality of computing elements by applying user-specified failure criteria to the initial state, for generating a plurality of recovery states of the plurality of computing elements corresponding to the failure states based at least on an initial state of the plurality of computing elements by applying a plurality of recovery rules to the failure states, and for outputting the recovery states for subsequent analysis, the failure criteria regarding a plurality of failures of the plurality of computing elements, wherein each failure comprises one of a single hardware failure within the plurality of computing elements and a single software failure within the plurality of computing elements, the failures comprising at least three failures;

wherein the failure criteria comprise all possible combinations of one, two, and three of the failures;

and wherein one of the recovery rules comprises doing nothing.

* * * * *